US012694806B2

(12) United States Patent
Miao et al.

(10) Patent No.: US 12,694,806 B2
(45) Date of Patent: Jul. 28, 2026

(54) VIRTUAL BIAS LIGHTING

(71) Applicant: Meta Platforms Technologies, LLC, Menlo Park, CA (US)

(72) Inventors: Jun Miao, San Jose, CA (US); Alex Dongseok Shin, Brea, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/782,296

(22) Filed: Jul. 24, 2024

(65) Prior Publication Data

US 2025/0338378 A1 Oct. 30, 2025

Related U.S. Application Data

(60) Provisional application No. 63/640,815, filed on Apr. 30, 2024.

(51) Int. Cl.
| | |
|---|---|
| *H05B 47/11* | (2020.01) |
| *G02B 27/01* | (2006.01) |
| *G09G 3/00* | (2006.01) |
| *G09G 3/34* | (2006.01) |
| *H05B 47/125* | (2020.01) |
| *H05B 47/165* | (2020.01) |

(52) U.S. Cl.
CPC ......... *G09G 3/001* (2013.01); *G02B 27/0172* (2013.01); *G09G 3/3406* (2013.01); *H05B 47/11* (2020.01); *H05B 47/125* (2020.01); *H05B 47/165* (2020.01); *G02B 2027/0138* (2013.01); *G02B 2027/014* (2013.01); *G09G*
*2320/0626* (2013.01); *G09G 2320/0666* (2013.01); *G09G 2360/144* (2013.01)

(58) Field of Classification Search
CPC ................ G09G 3/001; G09G 3/3406; G09G 2320/0626; G09G 2320/0666; G09G 2360/144; H05B 47/11; H05B 47/125; H05B 47/165; G02B 27/0172; G02B 2027/0138; G02B 2027/014
See application file for complete search history.

(56) References Cited

U.S. PATENT DOCUMENTS

| | | | |
|---|---|---|---|
| 2009/0237423 A1 | 9/2009 | Shih et al. | |
| 2013/0335404 A1 | 12/2013 | Westerinen et al. | |
| 2020/0098335 A1 | 3/2020 | Chen et al. | |
| 2023/0003931 A1* | 1/2023 | Nakamura | G02B 27/0172 |
| 2023/0015732 A1 | 1/2023 | Andall et al. | |

OTHER PUBLICATIONS

Non-Final Office Action, U.S. Appl. No. 19/092,865, Notification Date: Nov. 18, 2025, 28 pages.

* cited by examiner

*Primary Examiner* — Henry Luong
(74) *Attorney, Agent, or Firm* — FREESTONE INTELLECTUAL PROPERTY LAW PLLC; Aaron J. Visbeek

(57) ABSTRACT

A display of a head-mounted display renders a video-viewing window. A bias lighting boundary is rendered between the video-viewing window and a background. The bias lighting boundary reduces a contrast between the video-viewing window and the background.

20 Claims, 15 Drawing Sheets

200

200

230

230

230

200

233

250

234

235

232

231

BIAS LIGHTING WITH PASS-
THROUGH IMAGE

300

INITIATING A BRIGHTNESS MEASUREMENT OF AN
EXTERNAL ENVIRONMENT OF A HEAD MOUNTED DISPLAY
— 305

CAPTURING A PASS-THORUGH IMAGE OF THE EXTERNAL
ENVIRONMENT
— 310

APPLYING A BIAS LIGHTING BOUNDARY BETWEEN A VIDEO
VIEWING WINDOW IN RESPONSE TO THE BRIGHTNESS
MEASUREMENT BEING BELOW A THRESHOLD VALUE
— 315

450

410

410

430

250

410

BIAS
LIGHTING
430

BORDER
253

CONTENT
REGION 251

410

430

410

410

BIAS LIGHTING BOUNDARY FOR
HEAD-MOUNTED DISPLAY

— 1100

RENDERING A VIDEO VIEWING WINDOW FOR PRESENTING
VIDEO-MEDIA TO AN EYEBOX REGION     — 1105

RENDERING A BACKGROUND BEHIND THE
VIDEO VIEWING WINDOW     — 1110

RENDERING A BIAS LIGHTING BOUNDARY BETWEEN THE
VIDEO VIEWING WINDOW AND THE BACKGROUND     — 1115

BIAS LIGHTING BOUNDARY FOR
AUGMENTED REALITY

1200

CAPTURING IMAGES WITH A CAMERA OF AUGMENTED
REALITY GLASSES    1205

IDENTIFYING A TELEVISION INCLUDED IN THE IMAGES    1210

RENDERING A BIAS LIGHTING BOUNDARY AT LEAST
PARTIALLY AROUND THE TELEVISION.  THE BIAS LIGHTING
BOUNDARY IS PRESENTED AS A VIRTUAL IMAGE BY A
DISPLAY OF THE AUGMENTED REALITY GLASSES.    1215

VIRTUAL BIAS LIGHTING

CROSS-REFERENCE TO RELATED APPLICATIONS

This application claims priority to U.S. provisional Application No. 63/640,815 filed Apr. 30, 2024, which is hereby incorporated by reference.

TECHNICAL FIELD

This disclosure relates generally to head-mounted displays (HMDs), and in particular to bias lighting.

BACKGROUND INFORMATION

Consumers enjoy watching video content such as shows and movies on televisions in their home. Liquid Crystal Display (LCD) technology has been widely implemented in mass-produced televisions. More recently organic light-emitting diode (OLED) displays have been used for televisions and monitors. Regardless of the display technology implemented, desirable features in the viewing experience may include color saturation, screen brightness, and/or image contrast.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
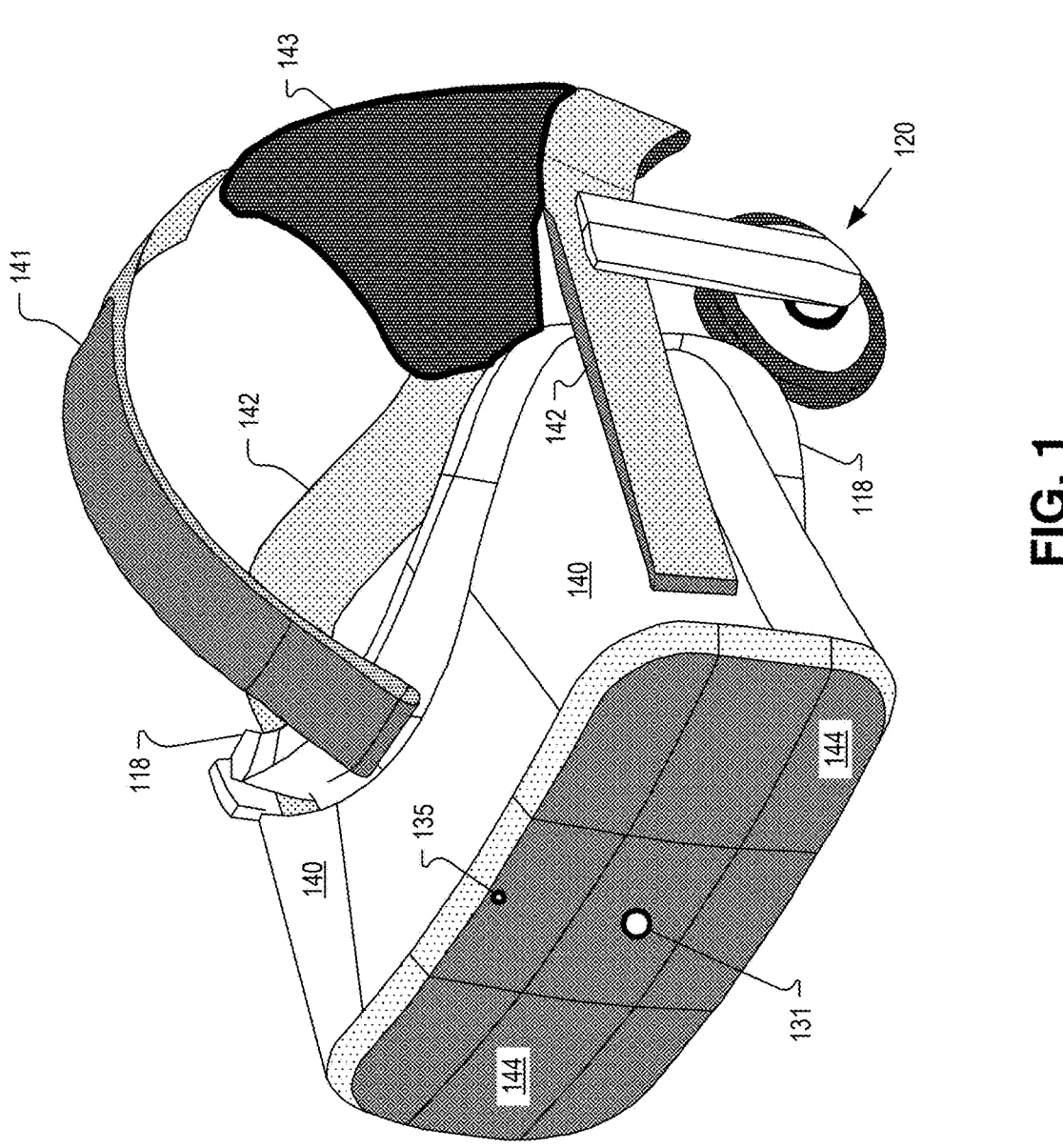
FIG. 1 illustrates a head-mounted display (HMD) that includes a display that may render a bias lighting boundary, in accordance with aspects of the disclosure.

Embodiments of virtual bias lighting are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

Bias lighting is a feature that may be implemented in existing televisions. Bias lighting may include light source(s) such as LEDs that are illuminated behind the display. The light from the light source(s) may illuminate the wall or television cabinet with a pleasing glow that enhances the atmosphere or overall mood of the viewing experience.

In implementations of the disclosure, a display of a head-mounted display renders a video-viewing window and a bias lighting boundary is rendered between the video-viewing window and a virtual background. The bias lighting boundary may improve the overall viewing experience by enhancing the overall mood with a pleasing glow. Additionally, the bias lighting boundary may reduce a contrast between the video-viewing window and the virtual background. This may make the dark portions of the video-content playing in the video-viewing window appear darker and the colors more vibrant. This reduced contrast between the video-viewing window and the virtual background may also reduce any eye-strain stemming from a sharp contrast between the virtual background and the video-content.

Virtual bias lighting may reduce the perceived brightness of the display by providing subtle ambient illumination around it, thereby alleviating fatigue associated with extended viewing of a bright screen against a dark background. This approach may also improve the perceived black levels, highlights, and overall contrast of the display. In the Mixed Reality (MR) mode, when users are engaged in prolonged video or movie watching, a virtual bias lighting system can be generated for the video frame. The brightness and chromaticity of this bias light may be determined based on camera data regarding the surrounding environment, enhancing the viewing experience.

If the (virtual) dark background is too dim, it may increase stress of muscles in the eye due to sudden contrast of bright video-viewing window versus a dark background. The virtual bias lighting eases this transition from bright screen to dark background. In an implementation, an ambient light sensor of a headset may measure real world lighting as below 10 lux and then implement the virtual bias feature in a Mixed Reality (MR) mode since the dark room may be "passed through" as the default background to the video-viewing window of an app.

In some implementations of the disclosure, a virtual bias feature is utilized in the context of augmented reality (AR) glasses. In this implementation, virtual bias lighting may surround a real television that the user sees in their external environment. A camera of the AR glasses may capture images of the external environment and a computer vision algorithm may detect and identify the television in the field of view of the user. The virtual bias feature may then be adjusted to match the size of the television and the virtual bias feature is driven onto a display of the AR glasses for every frame that the display presents virtual images to the eyebox region for the user. These and other embodiments are described in more detail in connection with FIGS. 1-12.

FIG. 1 illustrates a head-mounted display (HMD) 100 that includes a display that may render a bias lighting boundary, in accordance with aspects of the present disclosure. The display in HMD 100 is configured for presenting virtual images to the eye of a user of the HMD 100. HMD 100 may be considered a virtual reality (VR) headset or a mixed reality (MR) headset.

HMD 100 is one type of head-mounted display, typically worn on the head of a user to provide virtual reality content to a user. The illustrated example of HMD 100 is shown as including a viewing structure 140, a top securing structure 141, a side securing structure 142, a rear securing structure 143, and a front rigid body 144. In some examples, the HMD 100 is configured to be worn on a head of a user of the HMD 100, where the top securing structure 141, side securing structure 142, and/or rear securing structure 143 may include a fabric strap including elastic as well as one or more rigid structures (e.g., plastic) for securing the HMD 100 to the head of the user. HMD 100 may also optionally include one or more earpieces 120 for delivering audio to the ear(s) of the user of the HMD 100.

The illustrated example of HMD 100 also includes an interface membrane 118 for contacting a face of the user of the HMD 100, where the interface membrane 118 functions to block out at least some ambient light from reaching the eyes of the user of the HMD 100.

Example HMD 100 may also include a chassis for supporting hardware of the viewing structure 140 of HMD 100 (chassis and hardware not explicitly illustrated in FIG. 1). The hardware of viewing structure 140 may include any of processing logic, wired and/or wireless data interface for sending and receiving data (including video), graphic processors, and one or more memories for storing data and computer-executable instructions. In one example, viewing structure 140 may be configured to receive wired power and/or may be configured to be powered by one or more batteries. In addition, viewing structure 140 may be configured to receive wired and/or wireless data including video data.

Viewing structure 140 may include a display system having one or more electronic displays for directing light to the eye(s) of a user of HMD 100. The display system may include one or more of an LCD, an organic light emitting diode (OLED) display, or micro-LED display for emitting light (e.g., content, images, video, etc.) to a user of HMD 100. The display system is configured to present display light to an eyebox region. The display light may include virtual images that include virtual objects.

In the illustrated implementation of FIG. 1, HMD 100 includes a camera 131 configured to capture images of an external environment of the HMD. Camera 131 may capture pass-through images and the pass-through images (or derivatives of the pass-through images) may be displayed on one or more displays of HMD 100. Camera 131 may include a lens assembly configured to focus image light to a complementary metal-oxide semiconductor (CMOS) image sensor, in some implementations. HMD 100 may also optionally include a photosensor 135 that is configured to make a brightness measurement of the external environment of HMD 100. The photosensor 135 may include a photodiode or an array of photodiodes. In some implementations, camera 131 is used to generate a brightness measurement from pixel values of images captured by camera 131.

Figure 2A:
FIG. 2A illustrates a virtual image presented by an HMD that includes an example bias lighting boundary applied to a video-viewing window, in accordance with aspects of the disclosure.

FIG. 2A illustrates a virtual image 200 presented by an HMD that includes an example bias lighting boundary 230 applied to a video-viewing window showing a landscape image of a beach, a rock formation, the sky, and water, in accordance with aspects of the disclosure.

Figure 2B:
FIG. 2B illustrates that colors of the bias lighting boundary may be influenced by the media colors included in video-media being presented within the video-viewing window, in accordance with aspects of the disclosure.

FIG. 2B illustrates that colors of the bias lighting boundary 230 may be influenced by the content-colors included in video-media being presented within the video-viewing window 250, in accordance with aspects of the disclosure. By way of example, region 231 of bias lighting boundary 230 may include orange and tan colors that match or compliment the color of the beach in the video-media, region 232 of bias lighting boundary 230 may include colors that match or compliment the rock formation in the video-media, region 233 of bias lighting boundary 230 may include colors that match or compliment the sky in the video-media, region 234 of bias lighting boundary 230 may include colors that match or compliment the water, and region 235 of bias lighting boundary 230 may include colors that match or compliment the beach or rock formation in the video-media.

Figure 2C:
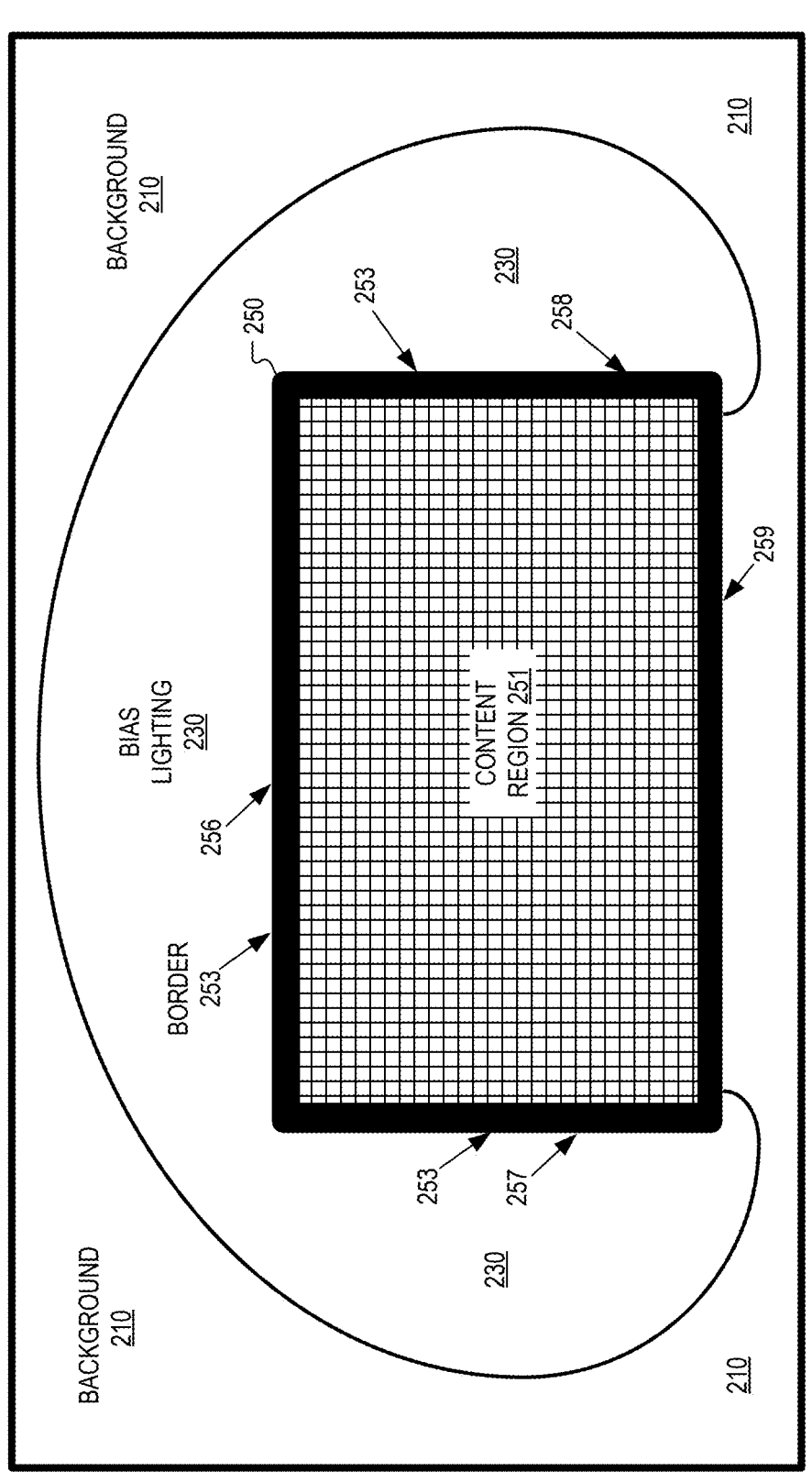
FIG. 2C illustrates an example bias lighting boundary disposed between a virtual background and a video-viewing window, in accordance with aspects of the disclosure.

FIG. 2C illustrates an example bias lighting boundary 230 disposed between a virtual background 210 and a video-viewing window 250, in accordance with aspects of the disclosure. Video-viewing window 250 is configured to play video-media such as shows or movies for users of an HMD. Video-media may be streamed to the HMD or be stored locally on the HMD prior to being rendered one or more displays of the HMD. Video-viewing window 250 may be included in an application or "app" being run on an operating system of the HMD.

In the example of FIG. 2C, video-viewing window 250 includes a content region 251 and a border 253 surrounding the content region 251. The content region 251 is where the video-media is played while the border 253 may remain a fixed dark (e.g. black) color. In some implementations, video-viewing window 250 includes a content region 251 and no border 253. Video-viewing window 250 includes a top 256, a left-side 257, a right-side 258, and a bottom 259, in the illustrated example. In FIG. 2C, the bias lighting boundary 230 is applied primarily to top 256, left-side 257, and right-side 258 of the video-viewing window 250 while the bias lighting boundary 230 is not applied (or lightly applied) to bottom 259 of the view viewing window 250. In the illustrated example, bias lighting boundary 230 touches a portion of the bottom 259 of video-viewing window 250, but not all of bottom 259. In some implementations, the bias lighting boundary 230 may completely surround video-viewing window 250. The shape of bias lighting boundary 230 may be different, in different implementations.

In FIG. 2C, bias lighting boundary 230 is disposed between video-viewing window 250 background 210. In some implementations, bias lighting boundary 230 surrounds video-viewing window 250. In some implementations, bias lighting boundary 230 is a brightened portion of background 210. Background 210 may be a virtual background. The virtual background may be of a pre-saved virtual environment, for example. Background 210 may also be a pass-through background derived from a pass-through image captured by the HMD. For example, camera 131 of HMD 100 may capture a pass-through image. Having background 210 include a pass-through background assists users in knowing, and if needed, interacting with their external environment.

Figure 3:
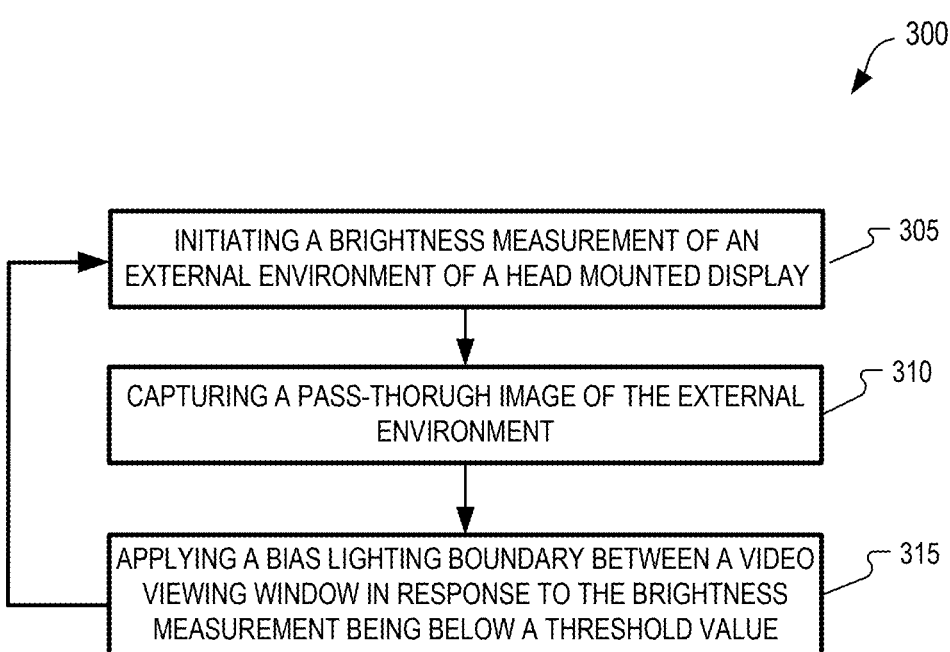
FIG. 3 illustrates a flow chart of an example process of using bias lighting with a pass-through image, in accordance with aspects of the disclosure.

FIG. 3 illustrates a flow chart of an example process 300 of using bias lighting with a pass-through image, in accordance with aspects of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel. All or a portion of the process blocks of process 300 may be executed by processing logic of an HMD.

In process block 305, a brightness measurement of an external environment of a head mounted display (HMD) is initiated. The brightness measurement may be taken by a camera (e.g. camera 131 of HMD 100) or by a separate brightness sensor (such as photosensor 135 of HMD 100).

In process block 310, a pass-through image of the external environment of the HMD is captured. If the external environment is dark enough (brightness below the threshold value) and the darkness of the external environment is passed through as a dark pass-through background 210, the bias lighting boundary 230 may be beneficial to assist in contrast perception for the user. For bright external environments that are passed through as a pass-through background 210, the bias lighting boundary 230 may be less useful to reduce a contrast between the video-viewing window and the pass-through background.

In process block 315, a bias lighting boundary is applied to a video-viewing window in response to the brightness measurement being below a threshold value. In an implementation, the threshold value is approximately 10 lux. The bias lighting boundary may reduce a contrast between the video-viewing window and the pass-through image that is rendered as a pass-through background to the video-viewing window.

In some implementations of process 300, process 300 returns to process block 305 after executing process block 315.

In implementations of process 300, the bias lighting boundary is disposed between the pass-through background and the video-viewing window.

In implementations of process 300, brightness and chromaticity of the bias lighting boundary are adjusted in response to a pass-through image captured by a camera of the HMD. The brightness and/or chromaticity of the bias lighting boundary may be adjusted to better blend with a pass-through background derived from the pass-through image.

Figure 4A:
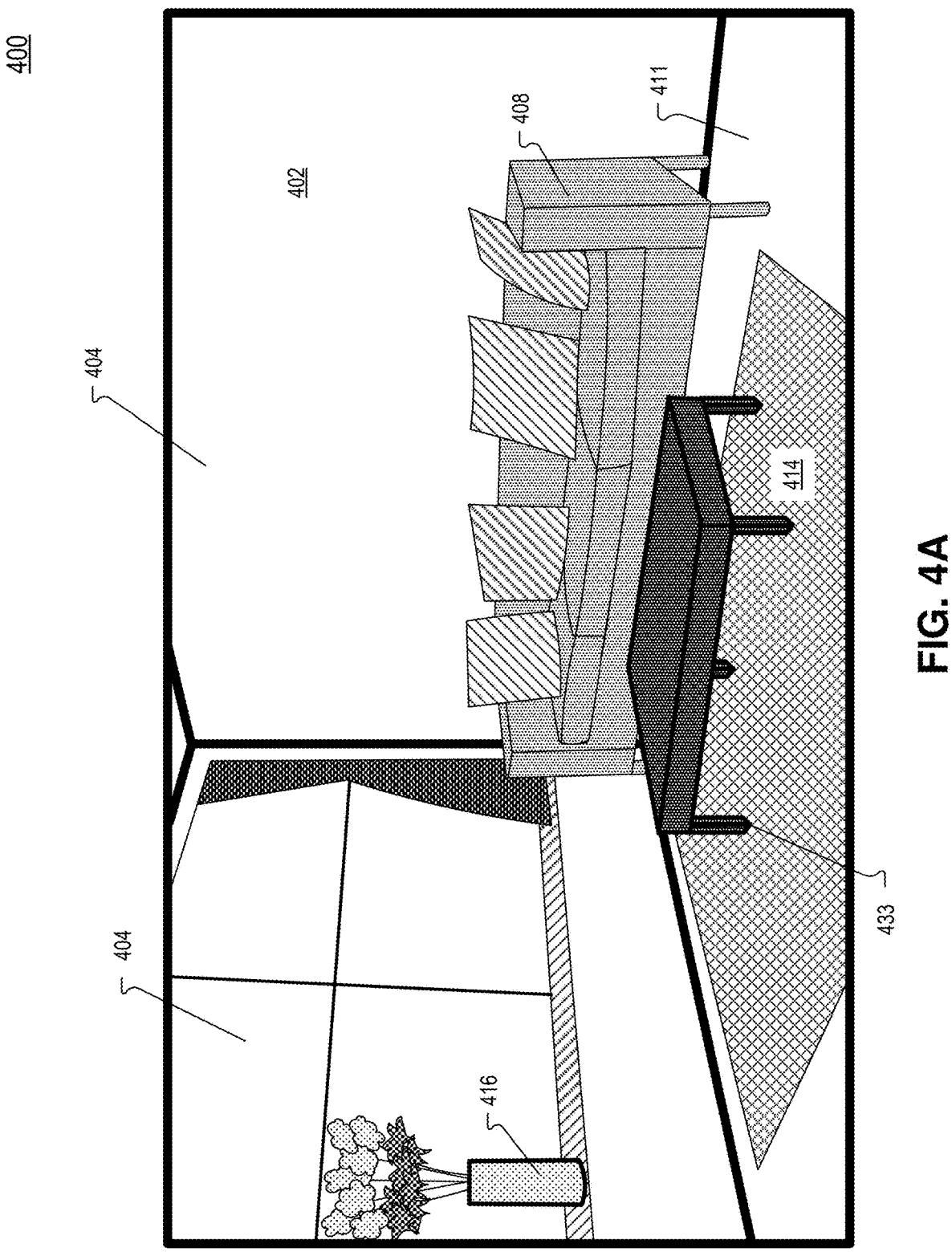
FIG. 4A illustrates an example pass-through image captured by a camera of an HMD, in accordance with aspects of the disclosure.

FIG. 4A illustrates an example pass-through image 400 captured by a camera of an HMD, in accordance with aspects of the disclosure. Pass-through image 400 includes a living room that the user may be sitting in. The living room includes a window 404 having a vase 416 full of flowers sitting on the windowsill. The living room includes a wall 406, couch 408 (including striped throw pillows) and a floor 411. A table 433 having four legs stands on a rug 414 laying on floor 411 in front of couch 408.

Figure 4B:
FIG. 4B illustrates a pass-through background of a virtual image is derived from a pass-through image, in accordance with aspects of the disclosure.

FIG. 4B illustrates that pass-through background 410 of virtual image 450 is derived from pass-through image 400. In FIG. 4B, the bias lighting boundary 430 is disposed between the pass-through background 410 and the video-viewing window 250. Video-viewing window 250 includes dark border 253 around content region 251. Dark border 253 of the video-viewing window 250 is disposed between the bias lighting boundary 430 and the content region 251 of the video-viewing window 250.

Figure 6:
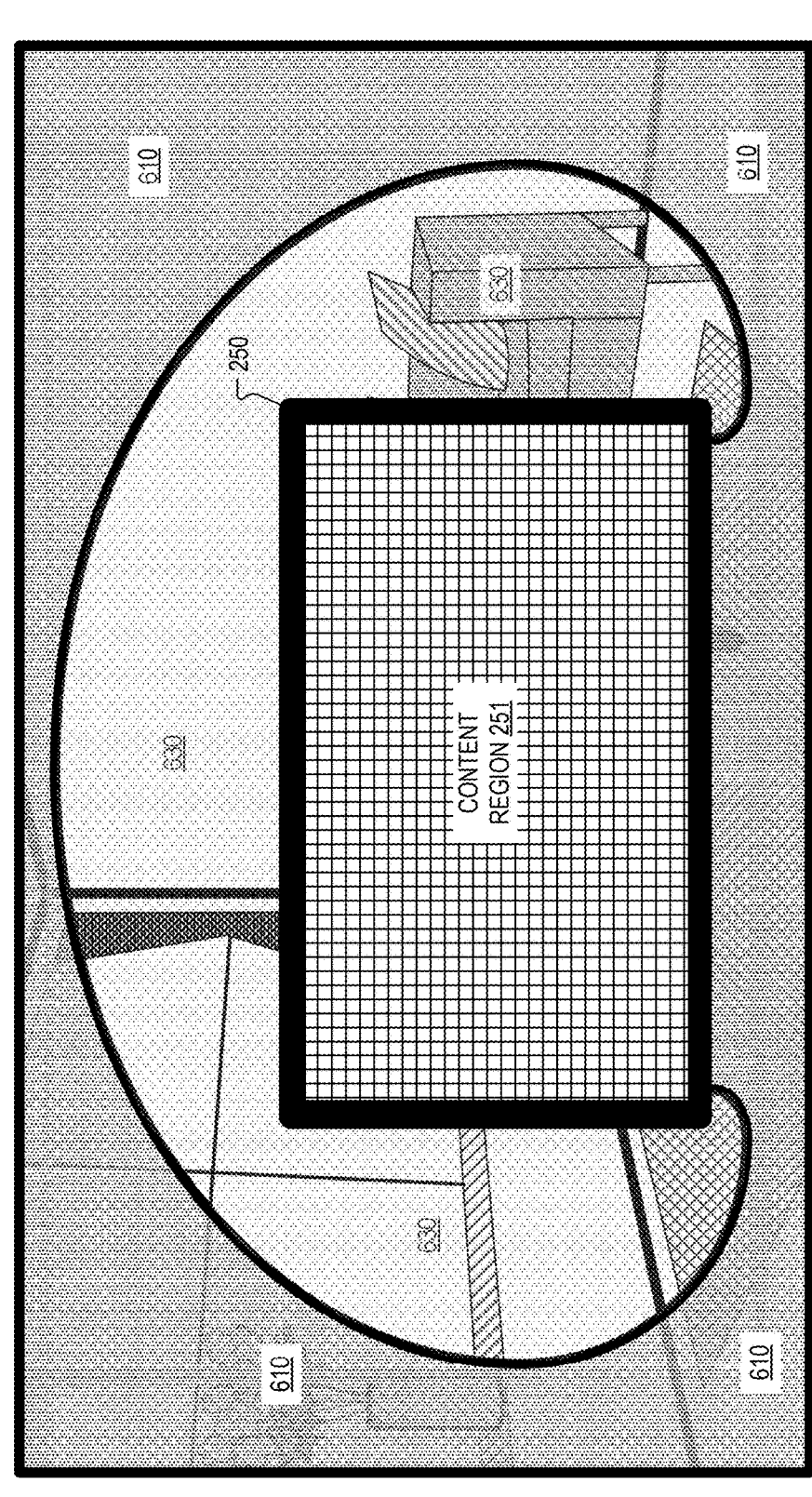
FIG. 6 shows a bias lighting boundary that is a brightened portion of a pass-through background, in accordance with aspects of the disclosure.

FIG. 6 shows a bias lighting boundary 630 that is a brightened portion of pass-through background 610. A pass-through image of an external environment of the HMD may be visible in both the bias lighting boundary 630 and the pass-through background 610 with bias lighting boundary 630 being brighter/lighter than pass-through background 610 to reduce the contrast between pass-through background 610 and dark border 253. Referring again to FIG. 4B, bias lighting boundary 430 may be rendered so that objects from the pass-through image are not visible in bias lighting boundary 430, but the objects from pass-through image may be rendered to be visible to a user in pass-through background 410.

Figure 5:
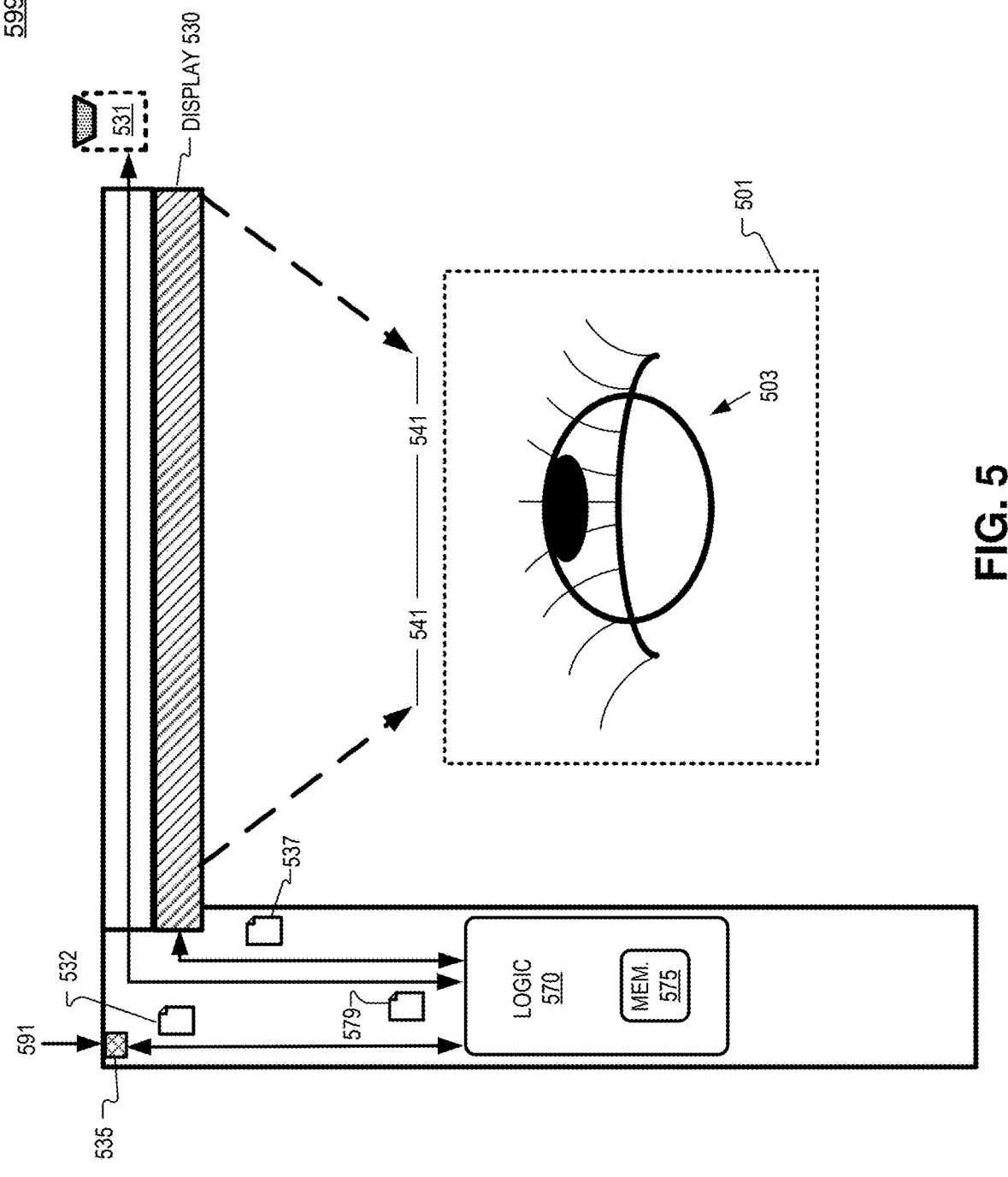
FIG. 5 illustrates a top view of a portion of an example HMD that includes a display for rendering video-viewing windows and bias lighting boundaries, in accordance with aspects of the disclosure.

FIG. 5 illustrates a top view of a portion of an example HMD 599 that includes a display for rendering video-viewing windows and bias lighting boundaries, in accordance with aspects of the disclosure. HMD 599 may have some similar features as HMD 100 of FIG. 1.

HMD 599 includes a display layer 530. Display layer 530 presents virtual images in display light 541 to an eyebox region 501 for viewing by an eye 503. Additional optical layers (not specifically illustrated) may also be included in HMD 599 to focus display light 541 to eye 503.

HMD 599 may include a photosensor 535 configured to generate a brightness measurement 532 of ambient light 591 of the external environment of HMD 599. FIG. 5 illustrates that processing logic 570 is communicatively coupled to photosensor 535. Processing logic 570 is configured to initiate the brightness measurement 532 and configured to receive the brightness measurement from photosensor 535. Processing logic 570 may be communicatively coupled to a plurality of photosensors distributed in different locations in HMD 599 and receive a plurality of brightness measurements from the different photosensors, in some implementations. Photosensor 535 may be include a photodiode, plurality of photodiodes, an ambient light sensor (ALS), an image sensor, and/or a SLAM camera. Brightness measurement 532 may be an image, in some implementations.

FIG. 5 illustrates that processing logic 570 is communicatively coupled to camera 531. Camera 531 is configured to image an external environment of HMD 599. Camera 531 may include a complementary metal-oxide semiconductor (CMOS) image sensor, in some implementations. In some implementations, an infrared filter that receives a narrow-band infrared wavelength may be placed over the image sensor of camera 531 so that it is sensitive to the narrow-band infrared wavelength while rejecting visible light and wavelengths outside the narrow-band. Infrared light sources such as infrared LEDs or infrared VCSELS (not specifically illustrated) that emit the narrow-band wavelength may be oriented to illuminate the external environment with the narrow-band infrared wavelength to assist in capturing images of the external environment. In some implementations, camera 531 may include a time-of-flight camera.

Processing logic 570 may initiate capturing, with camera 531, pass-through image(s) 579 of the external environment. Camera 531 may provide pass-through image(s) 579 to processing logic 570.

In the illustrated implementation of FIG. 5, a memory 575 is included in processing logic 570. In other implementations, memory 575 may be external to processing logic 570. In some implementations, memory 575 is located remotely from processing logic 570. In implementations, processing logic 570 generates virtual image(s) 537 for presentation by display layer 530 as display light 541. The virtual images may include video-viewing windows, bias lighting boundaries, and backgrounds. In some implementations, virtual images are stored in memory 575. Processing logic 570 may be configured to receive virtual images from a local memory or the virtual images may be wirelessly transmitted to the HMD 599 and received by a wireless interface (not illustrated) of the HMD.

Processing logic 570 may be configured to render, with the display layer 530, a video-viewing window to present video-media to eyebox region 501. The video-media may be stored in memory 575. The video-media may be streamed from a remote network prior to being played in the video-viewing window. Processing logic 570 may render a pass-through background (e.g. background 410 or 610) as a background to the video-viewing window. The pass-through background is derived from a pass-through image captured by camera 531. Processing logic 570 may also be configured to apply a bias lighting boundary between the video-viewing window and the pass-through background. Processing logic 570 and HMD may also be configured to render other bias light boundaries described in this disclosure.

Figure 7:
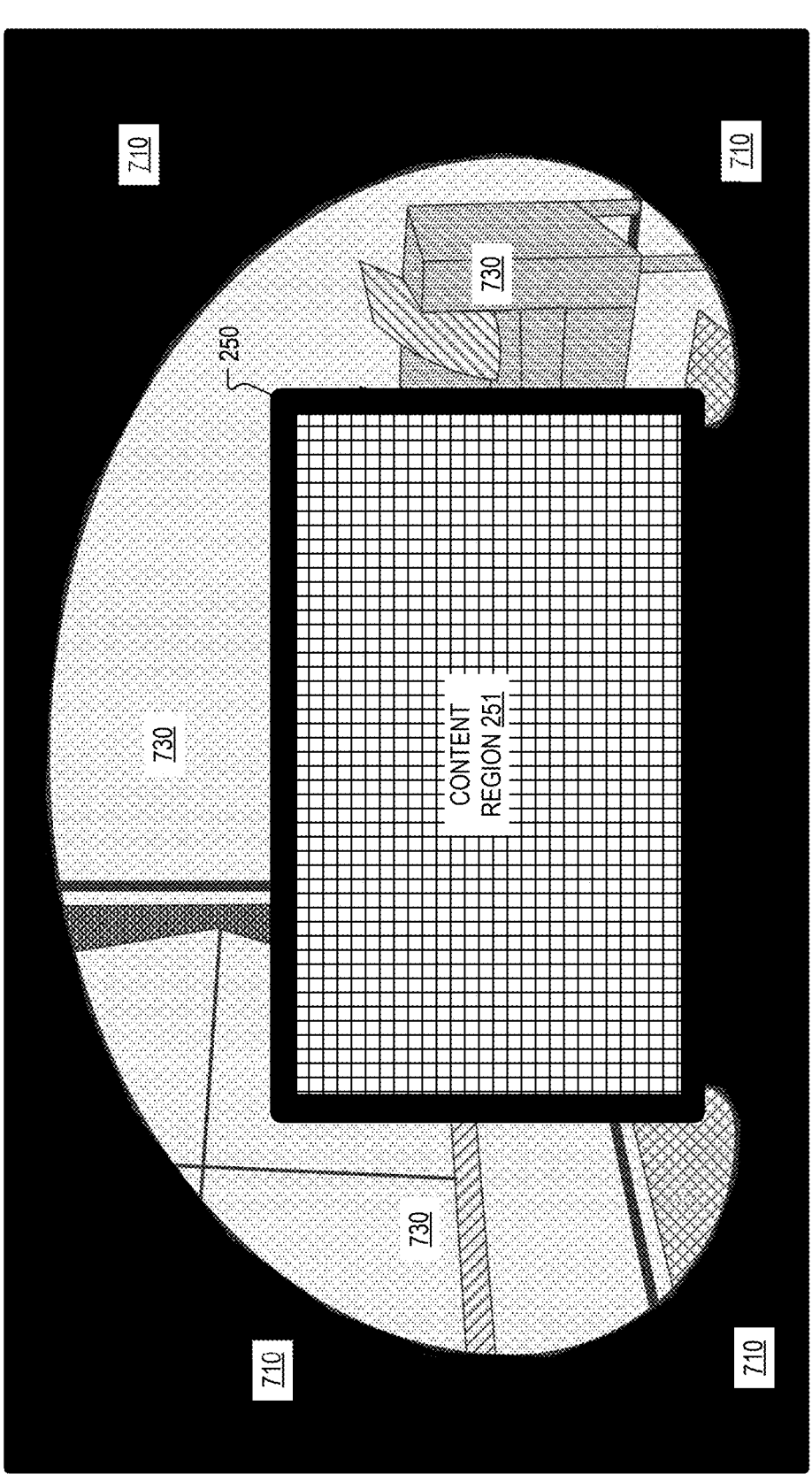
FIG. 7 illustrates a bias lighting boundary disposed between a video-viewing window and a background, in accordance with aspects of the disclosure.

FIG. 7 illustrates a bias lighting boundary 730 disposed between video-viewing window 250 and background 710, in accordance with aspects of the disclosure. In FIG. 7, bias lighting boundary 730 is brighter than background 710 and at least a portion of objects in the external environment of the HMD can be viewed in bias lighting boundary 730.

Figure 8:
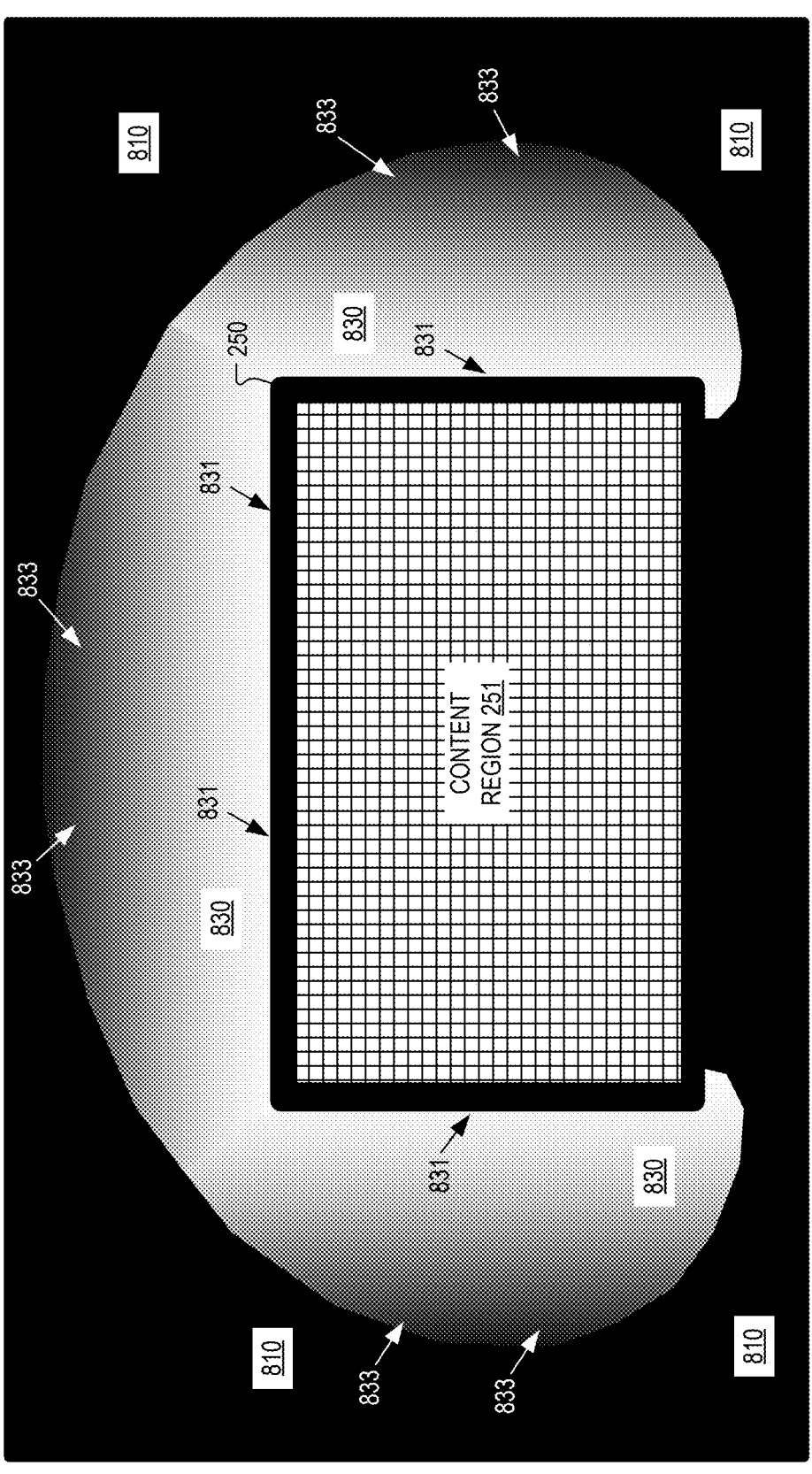
FIG. 8 illustrates a bias lighting boundary fading from light to dark, in accordance with aspects of the disclosure.

FIG. 8 illustrates a bias lighting boundary 830 fading from light to dark, in accordance with aspects of the disclosure. In FIG. 8, bias lighting boundary 830 includes brightest regions 831 that fade to darker regions 833 of the bias lighting boundary 830. The brightest regions 831 are disposed between the darker regions 833 and the video-viewing window 250. In some implementations, bias lighting boundary 830 may get darker according to a brightness gradient running from video-viewing window 250 to the outside of bias lighting boundary 830. This brightness gradient may assist bias lighting boundary 830 in blending into background 810, whether background 810 be a virtual background or a pass-through background.

Figure 9:
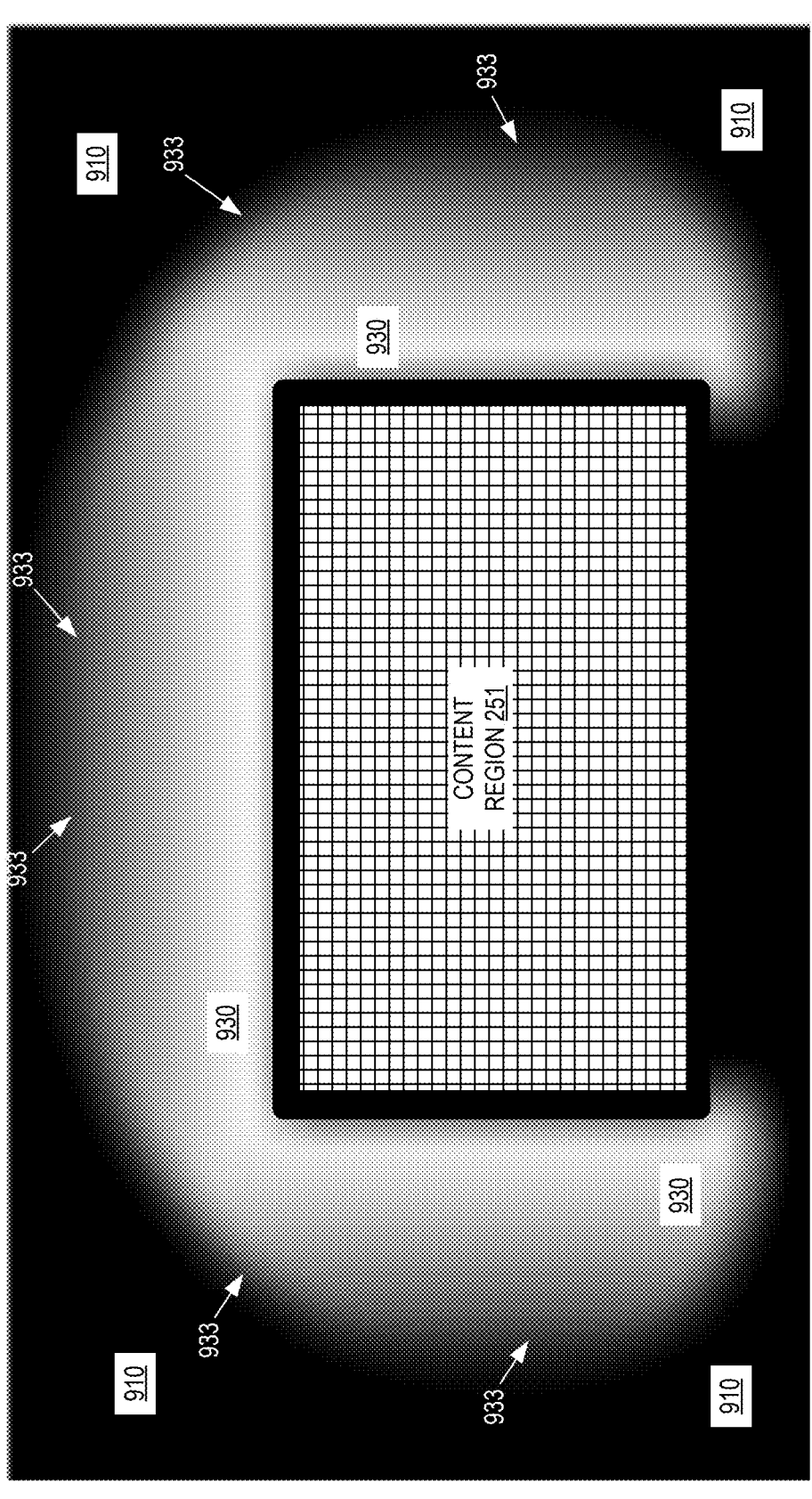
FIG. 9 illustrates a bias lighting boundary including an amorphous outside boundary, in accordance with aspects of the disclosure.

FIG. 9 illustrates a bias lighting boundary including an amorphous outside boundary, in accordance with aspects of the disclosure. In FIG. 9, the outside boundary 933 of bias lighting boundary 930 is amorphous and not easily identified. This may assist bias lighting boundary 930 in blending into background 910, whether background 910 be a virtual background or a pass-through background. In an implementation, a blur filter is applied at the outside boundary 933 of the bias lighting boundary 930 to blend a pass-through background 910 with the bias lighting boundary 930.

Figure 10:
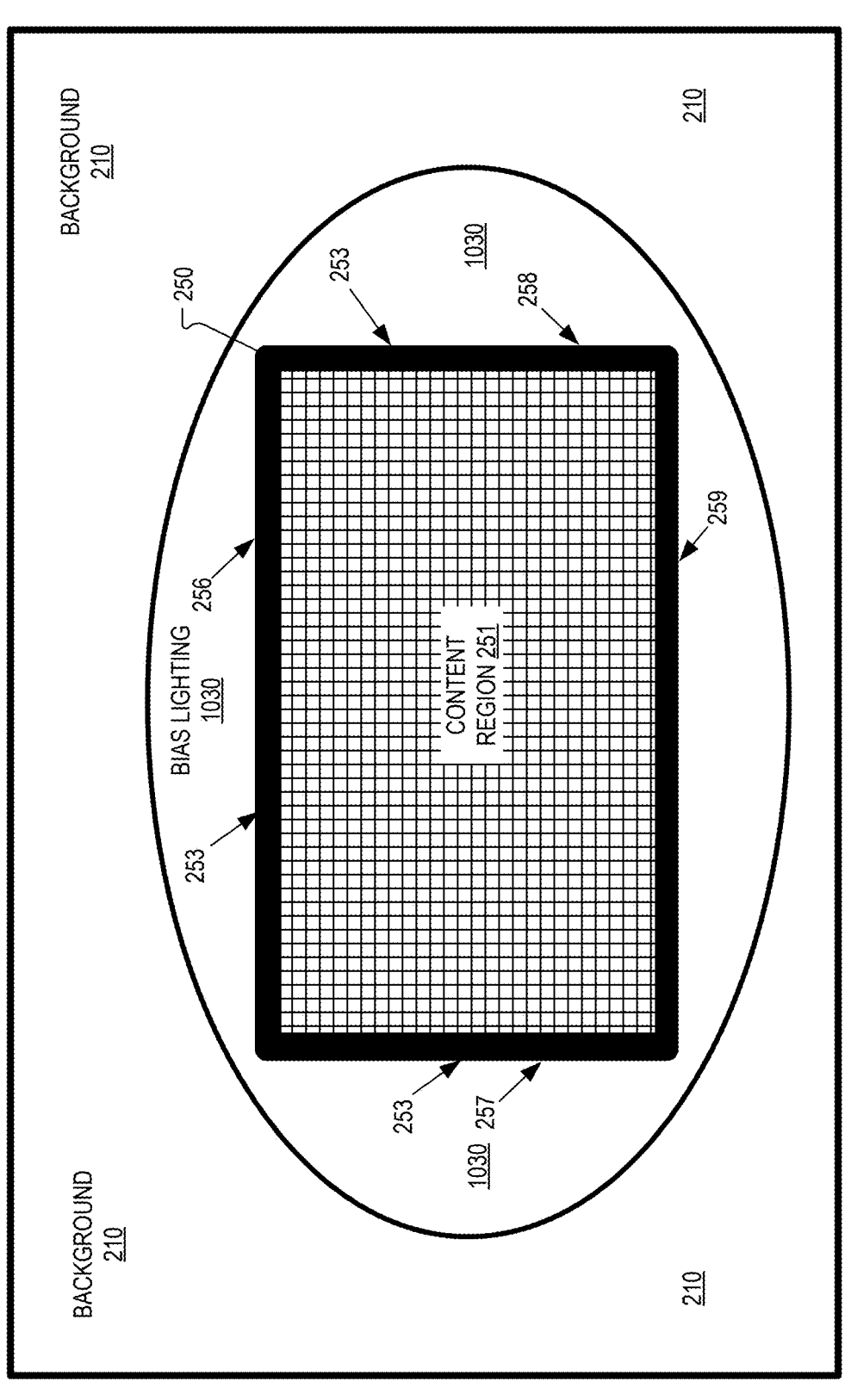
FIG. 10 illustrates an oval bias lighting boundary, in accordance with aspects of the disclosure.

FIG. 10 illustrates a bias lighting boundary may take different forms and shapes, in accordance with aspects of the disclosure. In FIG. 10, bias lighting boundary 1030 is shaped as an oval. Other shapes may be used as a bias lighting boundary. The outer edges of a bias lighting boundary may be freeform, in some implementations. In FIG. 10, bias lighting boundary 1030 surrounds the whole video-viewing window 250. Bias lighting boundary 1030 is applied to top 256, left-side 257, right-side 258, and bottom 259 of the video-viewing window 250.

Figure 11:
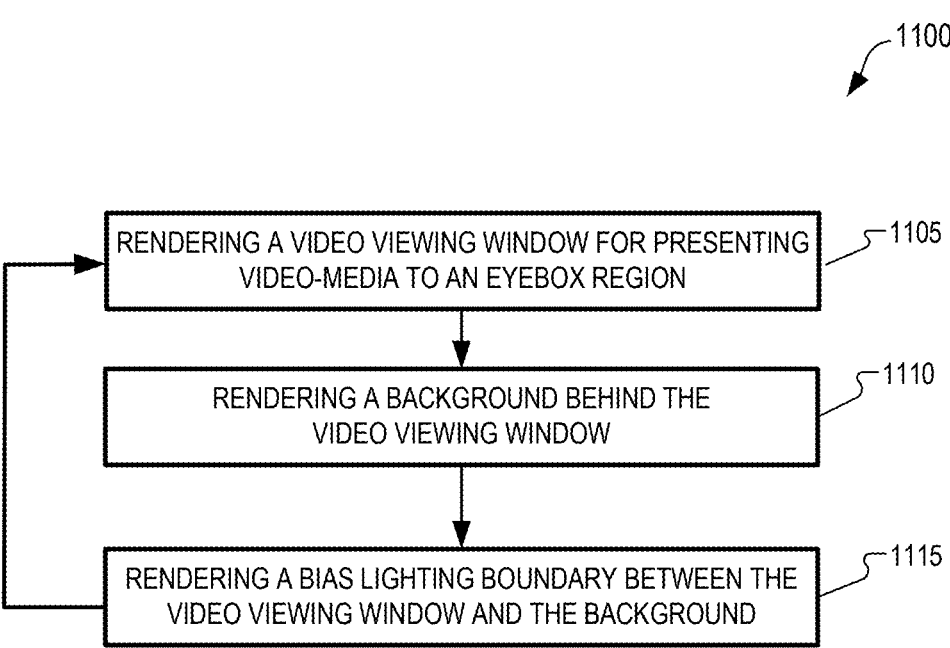
FIG. 11 illustrates a flow chart of an example process of applying a bias lighting boundary, in accordance with aspects of the disclosure.

FIG. 11 illustrates a flow chart of an example process 1100 of applying a bias lighting boundary, in accordance with aspects of the disclosure. The order in which some or all of the process blocks appear in process 1100 should not be deemed limiting. Rather, one of ordinary skill in the art having the benefit of the present disclosure will understand that some of the process blocks may be executed in a variety of orders not illustrated, or even in parallel. All or a portion of the process blocks of process 1100 may be executed by processing logic of an HMD.

In process block 1105, a video-viewing window for presenting video-media to an eyebox region is rendered by a display of an HMD.

In process block 1110, a background behind the video-viewing window is rendered to the display.

In process block 1115, a bias lighting boundary is rendered between the video-viewing window and the background. The bias lighting boundary reduces a contrast between the video-viewing window and the background.

In implementations of process 1100, process 1100 returns to process block 1105 after executing process block 1115.

In one implementation of process 1100, the bias lighting boundary surrounds the video-viewing window.

In one implementation of process 1100, colors of the bias lighting boundary are influenced by the content-colors included in the video-media being presented to the eyebox region. Implementations of process 1100 may further incorporate other bias light boundaries features described in this disclosure.

Figure 12:
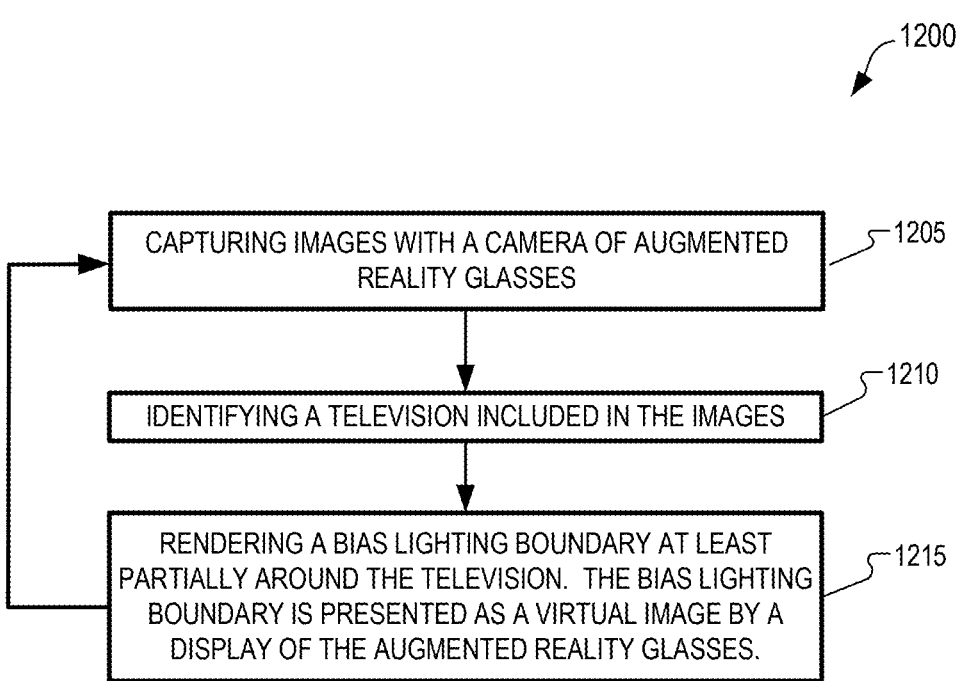
FIG. 12 illustrates a flow chart of an example process of applying a bias lighting boundary with augmented reality glasses, in accordance with aspects of the disclosure.

FIG. 12 illustrates a flow chart of an example process 1200 of applying a bias lighting boundary with augmented reality (AR) glasses, in accordance with aspects of the disclosure. The order in which some or all of the process blocks appear in process 1200 should not be deemed limiting. Rather, one of ordinary skill in the art having the benefit of the present disclosure will understand that some of the process blocks may be executed in a variety of orders not illustrated, or even in parallel. All or a portion of the process blocks of process 1200 may be executed by processing logic of an HMD.

In process block 1205, images are captured with a camera of AR glasses. The camera may be a front-facing camera of the AR glasses. The camera may image a field of view (FOV) of the user of the external environment of the user.

In process block 1210, a television included in the images is identified. A computer vision algorithm, machine learning (ML), or artificial intelligence (AI), or a combination may be utilized to identify the television. The television may be in the FOV of the user of the AR glasses.

In process block 1215, a bias lighting boundary is rendered at least partially around the television. The bias lighting boundary is presented as a virtual image by a display of the AR glasses. The bias lighting boundary may reduce a contrast between the video content of the television and the external environment. In some implementations, process 1200 returns to process block 1205 after executing process block 1215.

In some implementations of process 1200, a determination is made as to whether the television is displaying video content and the bias lighting boundary is not rendered unless the television is displaying video content. The determination may be made by image processing analysis on the images captured in process 1205

In some implementations of process 1200, a determination is made to whether the user is actually watching the video content presented on the television. In some implementations, eye-tracking data of the eye(s) of the user generated from an eye-tracking system of the AR glasses is used to assist in determining whether the user is watching the video content and the bias lighting boundary is not rendered unless the user is actually watching the video content.

In some implementations of process 1200, a brightness measurement of the external environment is initiated. In some implementations, a photosensor or a camera of the AR glasses is utilized for the brightness measurement. In some implementations, the brightness measurement must be below a threshold value to render the bias lighting boundary.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 570) in this disclosure may include one or more processors, microprocessors, multi-core processors, Application-specific integrated circuits (ASIC), and/or Field Programmable Gate Arrays (FP-GAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g. 575) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head-mounted display (HMD) comprising:
a camera configured to capture images of an external environment;
a display configured to present display light to an eyebox region; and
processing logic configured to:
initiate, with the camera, capturing a pass-through image of the external environment;
render, with the display, a video-viewing window to present video-media to the eyebox region;
render a pass-through background as a background to the video viewing window, wherein the pass-through background is derived from the pass-through image; and
apply a bias lighting boundary between the video-viewing window and the pass-through background.

2. The HMD of claim 1, wherein the bias lighting boundary is disposed between the pass-through background and the video-viewing window.

3. The HMD of claim 1, wherein the bias lighting boundary is a brightened portion of the pass-through background.

4. The HMD of claim 1, wherein brightness and chromaticity of the bias lighting boundary are adjusted in response to the pass-through image captured by the camera.

5. The HMD of claim 1, wherein a blur filter is applied at an outside boundary of the bias lighting boundary to blend the pass-through background with the bias lighting boundary.

6. A computer-implemented method comprising:
initiating a brightness measurement of an external environment of a head mounted display (HMD);
capturing a pass-through image of the external environment; and
applying a bias lighting boundary to a video-viewing window in response to the brightness measurement being below a threshold value, wherein the bias lighting boundary reduces a contrast between the video-viewing window and the pass-through image that is rendered as a pass-through background to the video-viewing window.

7. The computer-implemented method of claim 6, wherein the bias lighting boundary is disposed between the pass-through background and the video-viewing window.

8. The computer-implemented method of claim 7, wherein the video-viewing window includes a dark border around a content-region, and wherein the dark border of the video-viewing window is disposed between the bias lighting boundary and the content-region of the video-viewing window.

9. The computer-implemented method of claim 8, wherein the dark border is black.

10. The computer-implemented method of claim 6, wherein the bias lighting boundary is a brightened portion of the pass-through background.

11. The computer-implemented method of claim 6, wherein the bias lighting boundary includes a brightest region that fades to a darker region of the bias lighting boundary, wherein the brightest region is disposed between the darker region and the video-viewing window.

12. The computer-implemented method of claim 6, wherein the bias lighting boundary includes an amorphous outside boundary.

13. The computer-implemented method of claim 6, wherein a blur filter is applied at an outside boundary of the bias lighting boundary to blend the pass-through background with the bias lighting boundary.

14. The computer-implemented method of claim 6, wherein the bias lighting boundary is applied primarily to a top, a left-side, and a right-side of the video-viewing window, while the bias lighting boundary is not applied or lightly applied to a bottom of the view viewing window.

15. The computer-implemented method of claim 6, wherein colors of the bias lighting boundary are influenced by content-colors included in video-media being presented within the video-viewing window.

16. The computer-implemented method of claim 6, wherein brightness and chromaticity of the bias lighting boundary are adjusted in response to the pass-through image captured by a camera of the HMD.

17. The computer-implemented method of claim 6, wherein the bias lighting boundary surrounds the video-viewing window.

18. A computer-implemented method comprising:
rendering, with a display of a head-mounted display, a video-viewing window for presenting video-media to an eyebox region;
rendering, with the display of the head-mounted display, a background behind the video-viewing window; and
rendering a bias lighting boundary between the video-viewing window and the background, wherein the bias lighting boundary reduces a contrast between the video-viewing window and the background.

19. The computer-implemented method of claim 18, wherein the bias lighting boundary surrounds the video-viewing window.

20. The computer-implemented method of claim 18, wherein colors of the bias lighting boundary are influenced by content-colors included in the video-media being presented to the eyebox region.

* * * * *